(12) United States Patent
Kim et al.

(10) Patent No.: US 7,289,421 B2
(45) Date of Patent: Oct. 30, 2007

(54) OPTICAL PICKUP HEAD OF OPTICAL RECORDING REPRODUCING APPARATUS, FABRICATION METHOD THEREOF, LUBRICANT-COATED OPTICAL PICKUP HEAD OF OPTICAL RECORDING REPRODUCING APPARATUS AND LUBRICANT COATING METHOD THEREOF

(75) Inventors: Seong-Hyok Kim, Seoul (KR); Young-Joo Yee, Gyeonggi-Do (KR); Jung-Hoon Choi, Gyeonggi-Do (KR); Chang-Hoon Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 595 days.

(21) Appl. No.: 10/694,220

(22) Filed: Oct. 28, 2003

(65) Prior Publication Data
US 2004/0202101 A1    Oct. 14, 2004

(30) Foreign Application Priority Data
Oct. 30, 2002 (KR) .............. 10-2002-0066654
Nov. 21, 2002 (KR) .............. 10-2002-0072861

(51) Int. Cl.
*G11B 17/32* (2006.01)
(52) U.S. Cl. .................................. 369/300

(58) Field of Classification Search ............ 369/300, 369/221, 13.13, 44.19, 44.23; 360/126; 310/309; 720/681
See application file for complete search history.

(56) References Cited

U.S. PATENT DOCUMENTS

| 5,828,644 | A | 10/1998 | Gage et al. |
| 6,262,868 | B1 | 7/2001 | Arta et al. |
| 6,275,454 | B1* | 8/2001 | Boutaghou et al. ...... 369/44.19 |
| 6,288,985 | B1* | 9/2001 | Jordache et al. ......... 369/44.23 |
| 6,661,605 | B1* | 12/2003 | Pust et al. .................. 360/126 |
| 6,700,838 | B1* | 3/2004 | McDaniel ................ 369/13.13 |
| 6,903,486 | B2* | 6/2005 | Jerman et al. .............. 310/309 |
| 2002/0097639 | A1 | 7/2002 | Ishizaki et al. |
| 2002/0172136 | A1* | 11/2002 | Tezuka et al. .............. 369/221 |

FOREIGN PATENT DOCUMENTS

| EP | 1 398 766 A2 | 3/2004 |
| EP | 1 398 766 A3 | 3/2004 |
| KR | 2001-055398 | 2/2004 |
| WO | WO-98/48409 A2 | 10/1998 |

* cited by examiner

*Primary Examiner*—Tianjie Chen
(74) *Attorney, Agent, or Firm*—Birch, Stewart, Kolasch & Birch, LLP

(57) ABSTRACT

In an optical pickup head of an optical recording reproducing apparatus, a fabrication method thereof, a lubricant-coated optical pickup head of an optical recording reproducing apparatus and a method for coating lubricant onto an optical pickup head, by using a MEMS (micro electro mechanical system) technique used for designing, fabricating and application of a microstructure, it is possible to miniaturize an optical pickup head of an optical recording reproducing apparatus and reduce a fabrication cost thereof.

8 Claims, 12 Drawing Sheets

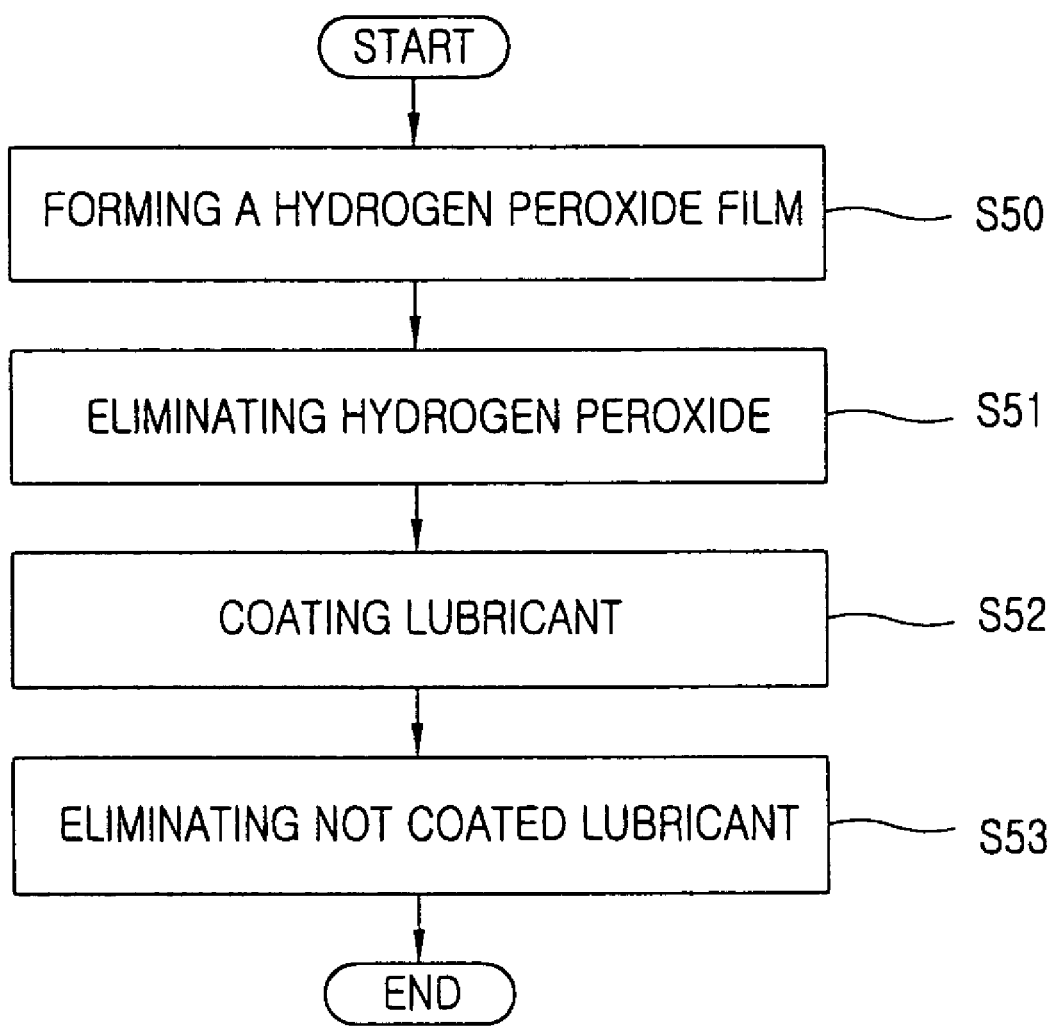

OPTICAL PICKUP HEAD OF OPTICAL RECORDING REPRODUCING APPARATUS, FABRICATION METHOD THEREOF, LUBRICANT-COATED OPTICAL PICKUP HEAD OF OPTICAL RECORDING REPRODUCING APPARATUS AND LUBRICANT COATING METHOD THEREOF

This nonprovisional application claims priority under 35 U.S.C. § 119(a) on patent application Nos. 10-2002-0066654 and 10-2002-0072861 filed in KOREA on Oct. 30, 2002 and Nov. 21, 2002, respectively, the entire contents of which are herein incorporated by reference.

BACKGROUND OF THE INVENTION

1. Field of the Invention

The present invention relates to an optical pickup head of an optical recording reproducing apparatus, a fabrication method thereof, a lubricant-coated optical pickup head of an optical recording reproducing apparatus and a method for coating lubricant onto an optical pickup head, and in particular to an optical pickup head of an optical recording reproducing apparatus capable of reading information recorded on an optical disk by irradiating light from an optical system onto a surface of the optical disk, a fabrication method thereof, a lubricant-coated optical pickup head of an optical recording reproducing apparatus and a method for coating lubricant onto an optical pickup head.

2. Description of the Related Art

The conventional magnetic recording apparatus includes a slider for ascending a head from a magnetic recording medium; a suspension for supporting the head; and a coil, etc. for generating a magnetic force, because of those construction parts, the apparatus is big and heavy, and accordingly there is a limit to miniaturize the apparatus.

In addition, in case of an optical recording reproducing apparatus using a rotating optical disk as an recording medium, due to flatness of an optical disk and mechanical vibration and eccentric error caused by a driving unit for rotating the optical disk, signal to noise ratio of an optical signal for recording and reproducing may be deteriorated, readable and recordable unit bit size may be restricted by that, and accordingly misreading and mis-recording may occur.

SUMMARY OF THE INVENTION

In order to solve the above-mentioned problem, it is an object of the present invention to provide an optical pickup head of an optical recording reproducing apparatus capable of being miniaturized and reducing a fabrication cost by using a MEMS (micro electro mechanical system) technique used for designing, fabricating and application of a microstructure, a fabrication method thereof, a lubricant-coated optical pickup head of an optical recording reproducing apparatus and a method for coating lubricant onto an optical pickup head.

In order to achieve the above-mentioned object, an optical pickup head of an optical recording reproducing apparatus includes a slider installed so as to be slidable along the surface of an optical disk and having a convergence lens for focusing light at a side; and a micro-actuating means installed so as to be laminated with the slider in order to adjust an optic axis of the convergence lens minutely.

An optical pickup head of an optical recording reproducing apparatus includes a slider installed so as to be slidable along the surface of an optical disk and having a convergence lens at a side for focusing light; and a micro-actuating means installed so as to be laminated with the slider in order to adjust an optic axis of the convergence lens minutely.

A method for fabricating an optical pickup head of an optical recording reproducing apparatus includes step of preparing a mother material on which an insulating layer is arranged and a silicon layer is laminated on both sides of the insulating layer; forming a lower body having a lower fixed electrode at a side of the mother body by using a certain semiconductor device fabricating processes, forming an upper body having an upper fixed electrode at the other side and forming a moving body installed between the upper and lower fixed electrodes so as to be movable and have a moving electrode alternately arranged between the upper and lower fixed electrodes; joining the body obtained by the preparing step to a slider; and combining a convergence lens with the body.

A lubricant-coated optical pickup head of an optical recording reproducing apparatus includes a slider installed so as to be slidable along the surface of an optical disk, having a convergence lens at a side for focusing light and having a lubricant-coated air bearing surface at the bottom; and a micro-actuating means installed so as to be laminated with the slider in order to adjust an optic axis of the convergence lens minutely.

A method for coating lubricant on an optical pickup head includes steps of coating lubricant onto upper and lower fixed electrodes, a moving electrode and an air bearing surface of a slider by dipping an optical pickup head into the lubricant; and eliminating the rest lubricant not coated on the upper and lower fixed electrodes, the moving electrode and the air bearing surface of the slider by dipping the optical pickup head in a toluene solvent.

A method for coating lubricant on an optical pickup head includes steps of coating lubricant onto upper and lower fixed electrodes, a moving electrode and an air bearing surface of a slider by installing an optical pickup head in a flow channel in which the lubricant flows; and eliminating the rest lubricant not coated onto the upper and lower fixed electrodes, the moving electrode and the air bearing surface of the slider by making a toluene solvent flow in the flow channel.

A method for coating lubricant on an optical pickup head includes steps of forming a silicon dioxide film onto upper and lower fixed electrodes, a moving electrode and an air bearing surface of a slider by dipping an optical pickup head into hydrogen peroxide; eliminating the rest hydrogen peroxide on the upper and lower fixed electrodes, the moving electrode and the air bearing surface of the slider by dipping the optical pickup head in a toluene solvent; coating lubricant on the upper and lower fixed electrodes, the moving electrode and the air bearing surface of the slider by dipping the optical pickup head in the lubricant; and eliminating the rest lubricant on the upper and lower fixed electrodes, the moving electrode and the air bearing surface of the slider by dipping the optical pickup head in a solvent.

A method for coating lubricant on an optical pickup head includes steps of forming a hydrogen peroxide film onto upper and lower fixed electrodes, a moving electrode and an air bearing surface of a slider by installing an optical pickup head in a flow channel in which hydrogen peroxide flows; eliminating the rest hydrogen peroxide on the upper and lower fixed electrodes, the moving electrode and the air bearing surface of the slider by making a toluene solvent flow in the flow channel; coating lubricant on the upper and lower fixed electrodes, the moving electrode and the air bearing surface of the slider by making the lubricant flow in the flow channel; and eliminating the rest lubricant on the upper and lower fixed electrodes, the moving electrode and the air bearing surface of the slider by making a toluene solvent flow in the flow channel.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 1 is an exploded-perspective view illustrating an optical pickup head;

FIG. 2 is a longitudinal-sectional view illustrating an optical pickup head;

FIG. 3 is a plane view illustrating an optical pickup head;

FIG. 4 is a sectional view taken along a line A-A in FIG. 3;

FIG. 5 is a bottom-perspective view illustrating an example of wiring;

FIG. 6 is a bottom-perspective view illustrating another example of wiring;

FIG. 7 illustrates an example of an elastic-supporting portion;

FIG. 8 illustrates another example of an elastic-supporting portion;

FIG. 9 illustrates yet another example of an elastic-supporting portion;

FIGS. 10 and 11 illustrate focal length error compensation;

FIGS. 13~15 illustrate a lubricant-coated optical pickup head of an optical recording reproducing apparatus in accordance with the present invention;

FIG. 13 is an exploded-perspective view illustrating an optical pickup head;

FIG. 15 illustrates a lubricant-coated surface of a slider;

FIGS. 16~20 are flow charts illustrating a coating process of a lubricant-coated optical pickup head in accordance with the present invention;

FIG. 16 is a flow chart illustrating an example of a coating process;

FIG. 17 illustrates a lubricant coating apparatus;

FIG. 18 is a flow chart illustrating another example of a coating process;

FIG. 19 is a flow chart illustrating yet another example of a coating process; and FIG. 20 is a flow chart illustrating still another example of a coating process.

DETAILED DESCRIPTION OF THE PREFERRED EMBODIMENT

Hereinafter, the preferred embodiment of an optical pickup head of an optical recording reproducing apparatus in accordance with the present invention will be described with reference to accompanying FIGS. 1~11.

Figure 1:
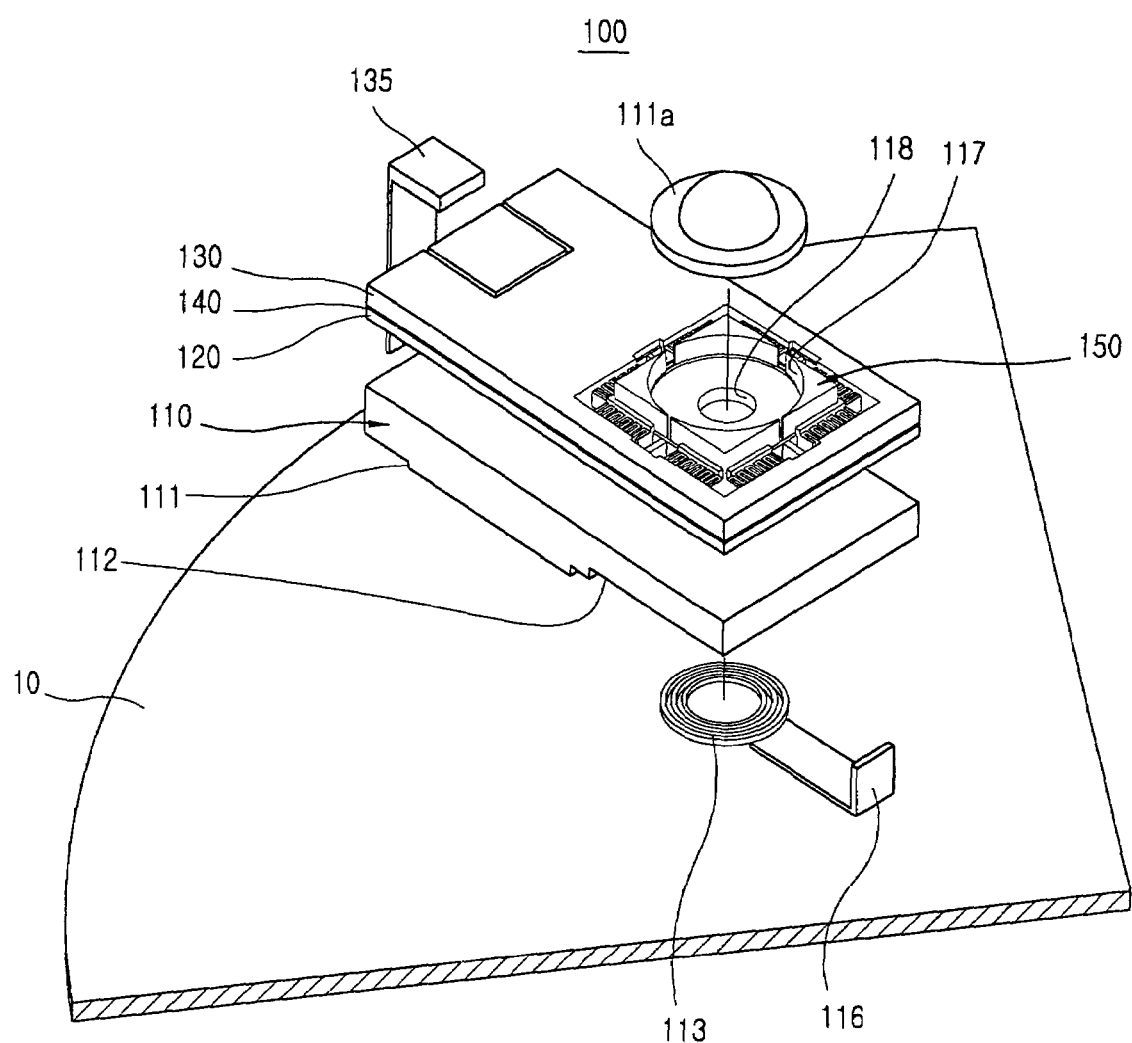
FIGS. 1~11 illustrate an optical pickup head of an optical recording reproducing apparatus in accordance with the present invention.
Figure 2:
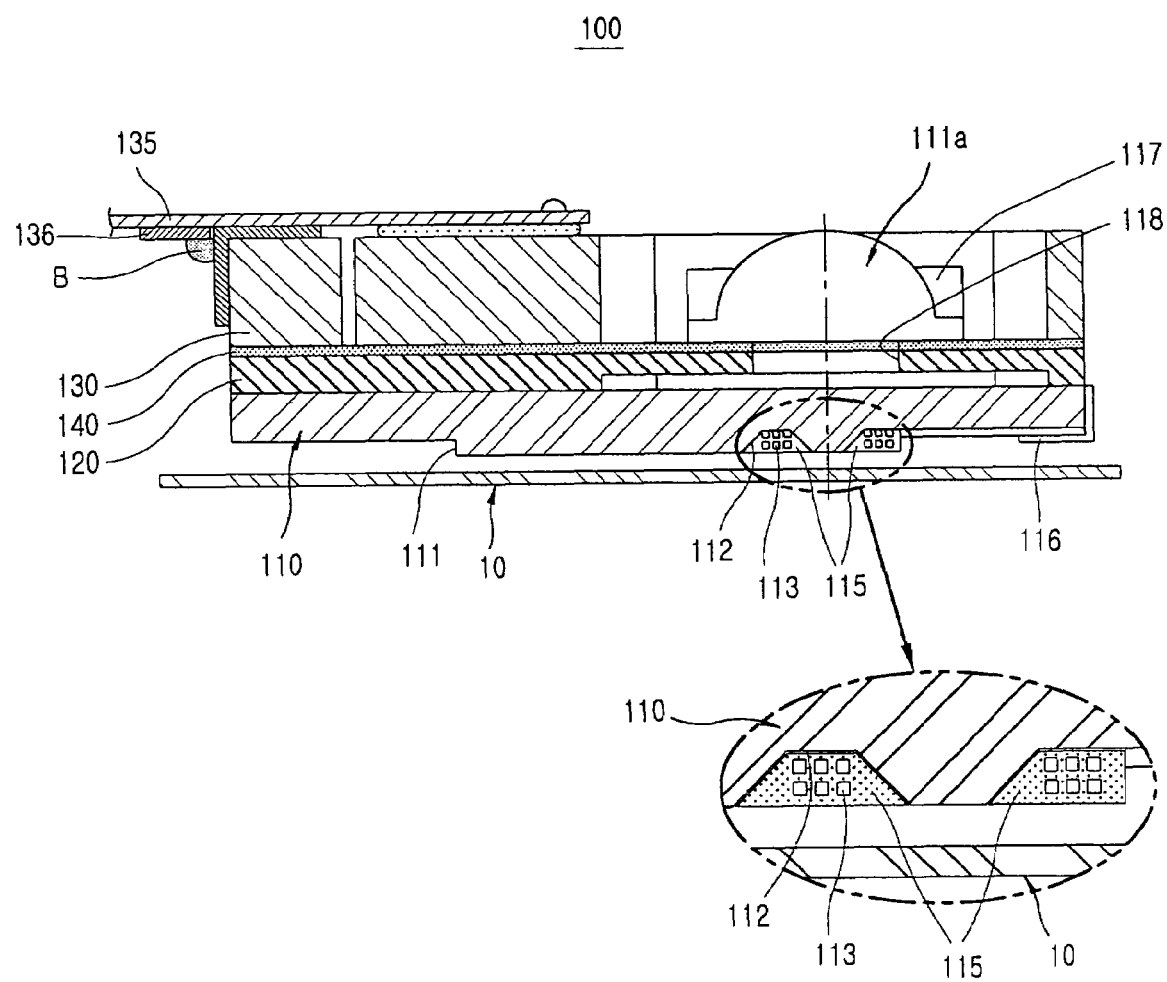
Figure 3:
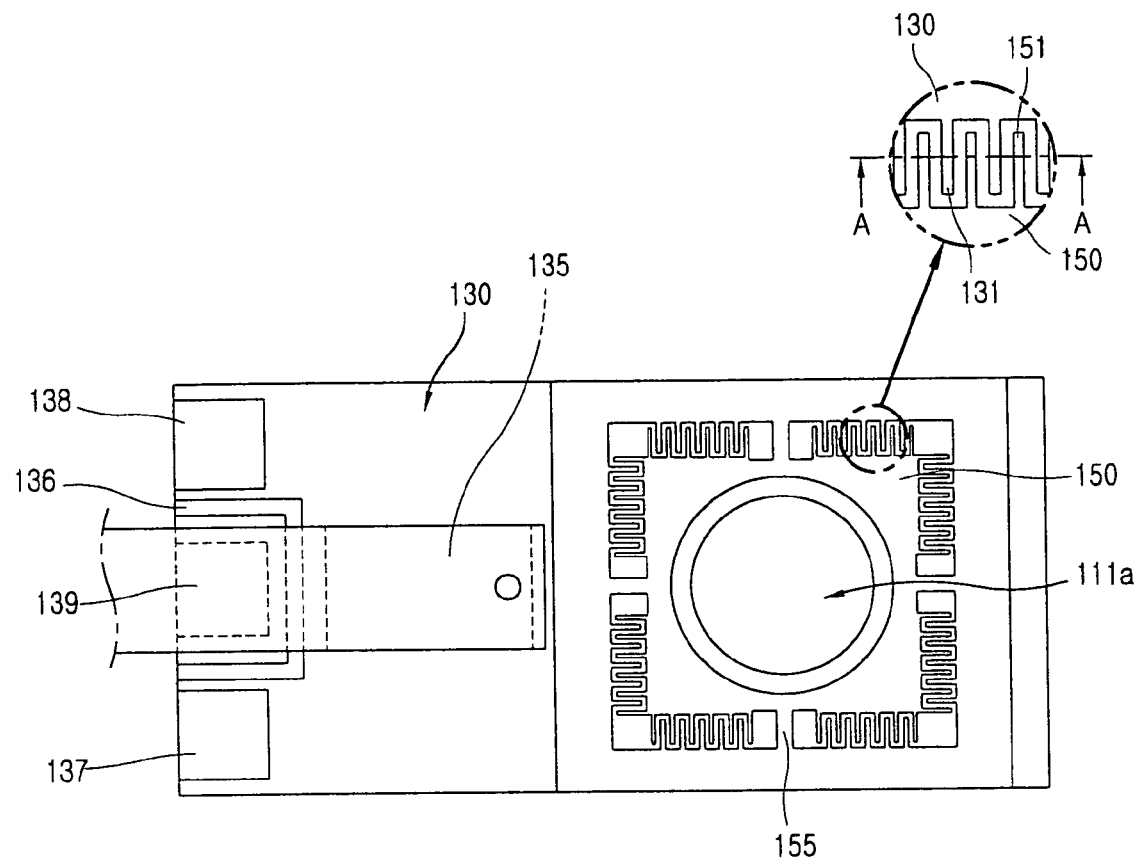
Figure 4:
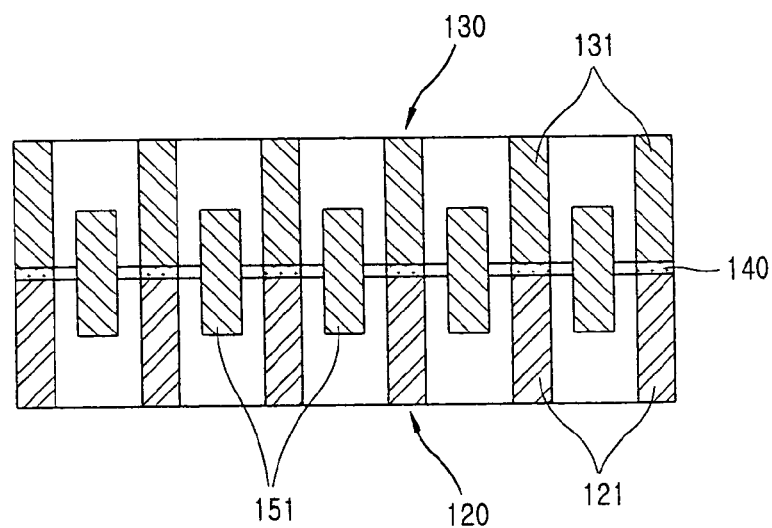
Figure 5:
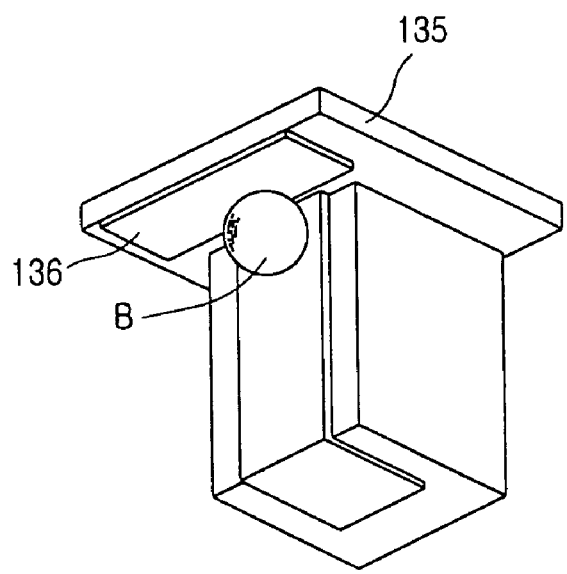
Figure 6:
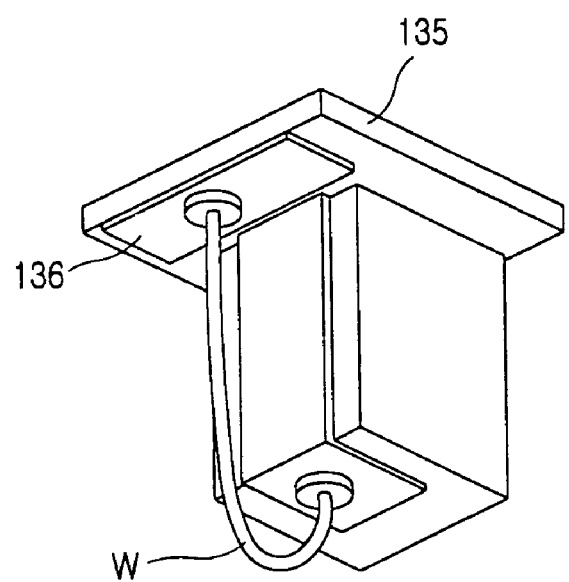
Figure 7:
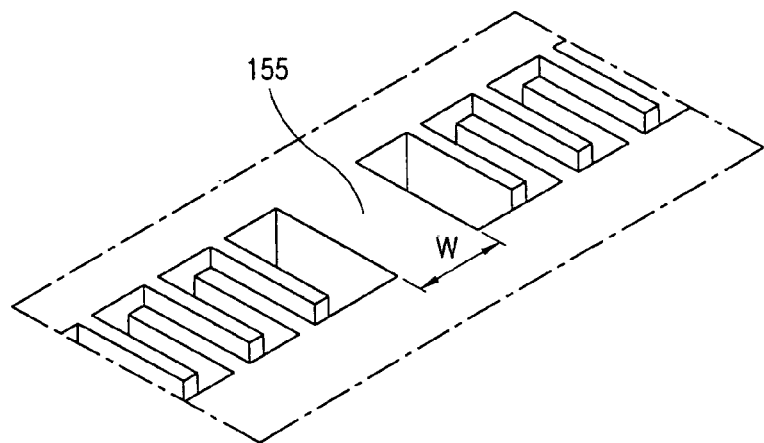
Figure 8:
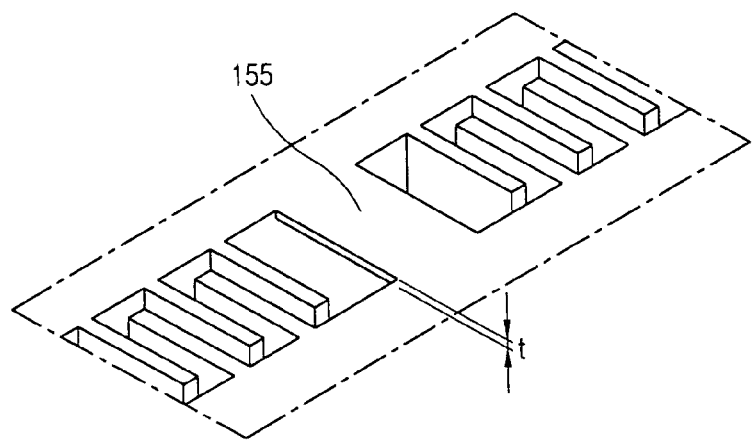
Figure 9:
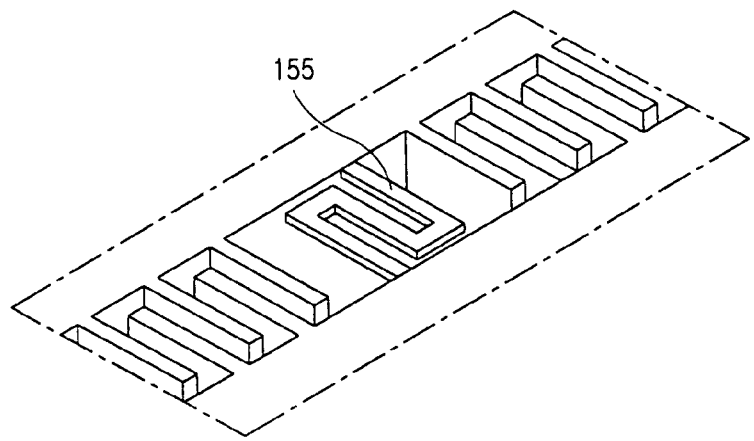
Figure 10:
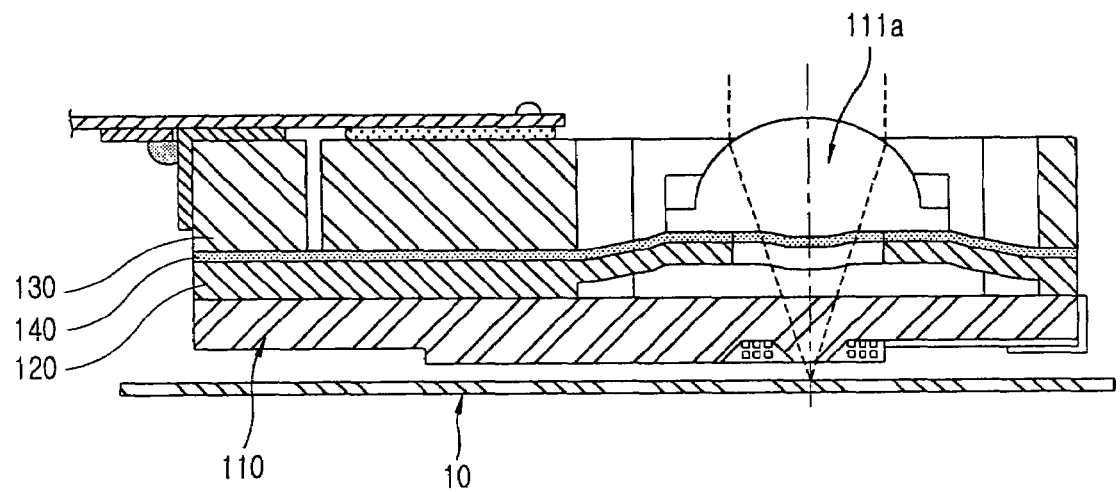
Figure 11:
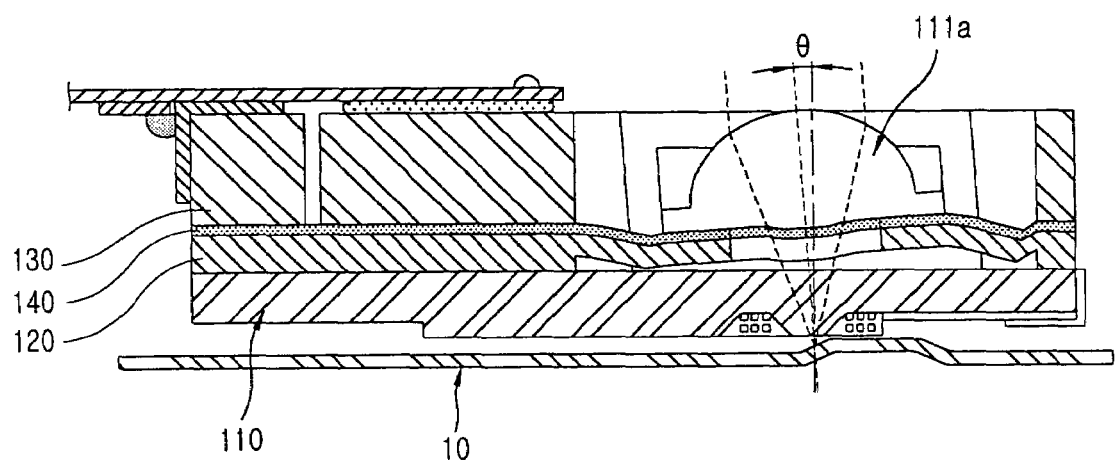

FIGS. 1~11 illustrate an optical pickup head of an optical recording reproducing apparatus in accordance with the present invention; FIG. 1 is an exploded-perspective view illustrating an optical pickup head; FIG. 2 is a longitudinal-sectional view illustrating an optical pickup head; FIG. 3 is a plane view illustrating an optical pickup head; FIG. 4 is a sectional view taken along a line A-A in FIG. 3; FIG. 5 is a bottom-perspective view illustrating an example of wiring; FIG. 6 is a bottom-perspective view illustrating another example of wiring; FIG. 7 illustrates an example of an elastic-supporting portion; FIG. 8 illustrates another example of an elastic-supporting portion; FIG. 9 illustrates yet another example of an elastic-supporting portion; and FIGS. 10 and 11 illustrate focal length error compensation.

As depicted in FIGS. 1~11, the optical pickup head 100 of the optical recording reproducing apparatus in accordance with the present invention includes a slider 110 installed so as to be slidable along the surface of an optical disk 10 and having a convergence lens 111a at a side; a lower fixed body 120 installed at the top of the slider 110 so as to adjust an optic axis of the convergence lens 111a minutely; a lower fixed body 120 installed at the top of the slider 110 so as to adjust an optic axis of the convergence lens 111a minutely and having plural lower fixed electrodes 121 on the inner circumference at regular intervals; an insulating layer 140 interposed between the lower fixed body 120 and the upper fixed body 130; a moving body 150 corresponded to the lower and upper fixed bodies 120, 130 so as to be moved in the optical axis direction and having a moving electrode 151 arranged alternately between the lower and upper fixed electrodes 121, 131; and plural electrode pads 137, 138, 139 for supplying power to the lower fixed body 120, the upper fixed body 130 and the moving body 150 in order to drive the moving body 150.

So as to transmit light, the slider 110 is made of a transparent material and has a plate shape. At a side corresponded to the optical disk 10, namely, at the bottom surface of the slider 110, an air bearing surface 111 is formed so as to be ascended from the surface of the optical disk 10 in rotating (operating) of the optical disk 10.

An insertion groove 112 is formed at the bottom surface of the slider 110, and a magnetic coil 113 for magnetizing the optical disk 10 is formed at the insertion groove 112. Filler 115 having at least one of $SIO_2$ and $SI_3N_4$ is charged around the circumference of the magnetic coil 113. The magnetic coil 113 is electrically connected with a side electrode pad 116.

As described-above, the optical pickup head 100 includes the fixed bodies 120, 130, 140; the moving body 150 arranged as a corn shape on the fixed body so as to be movable up and down according to power apply; and the slider 110 joined to the bottom of the fixed body.

The fixed body consists of the insulating layer 140; the lower fixed body 120 and the upper fixed body 130 laminated on the both side of the insulating layer 140; and the lower fixed electrode 121 and the upper fixed electrode 131 are respectively arranged on the lower and upper fixed bodies 120, 130.

By being corresponded to the lower and upper fixed electrodes 121, 131, the moving electrode 151 is formed on the moving body 150.

A lens mounting portion 117 on which the convergence lens 111a is mounted is formed on the top surface of the fixed body 130, and a light through hole 118 for passing light is formed at the center of the lens mounting portion 117.

A suspension 135 is connected to the upper fixed body 130 so as to support the optical pickup head. A side of the suspension 135 is fixed to a fixed structure (not shown), and the other side thereof is electrically connected to an external power pad 136 by a solder ball joint method.

The fixed body 130 includes the lower fixed body 120; the upper fixed body 130; a lower fixed body electrode pad 137 for supplying power to the moving body 140; an upper fixed body electrode pad 138; and a moving body electrode pad 139.

The lower fixed body electrode pad 137 and the upper fixed body electrode pad 138 are electrically connected to the external power connecting pad 136, as depicted in FIG. 5, there is the solder ball joint method for connecting the lower fixed body electrode pad 137 and the upper fixed body electrode pad 138 to the external power connecting pad 136 by using solder ball (B), as depicted in FIG. 6, there is a joint method for connecting them by using wire (W).

In order to support the moving body 150 elastically, an elastic-supporting portion 155 is formed between the upper and lower fixed bodies 130, 120.

As depicted in FIG. 7, the elastic-supporting portion 155 can be constructed to have a width (W), as depicted in FIG. 8, it can be constructed to have a thickness (t), as depicted in FIG. 9, it can be constructed so as to be curved several times.

In the optical pickup head of the optical recording reproducing apparatus, when power is on and the optical disk 10 is rotated, the slider 110 is ascended above the surface of the optical disk 10 by the air bearing surface 111. Herein, the magnetic coil 113 magnetizes the surface of the optical disk 10. Light from an optical system (not shown) is irradiated and reflected onto the surface of the optical disk 10 through the convergence lens 11a, and accordingly information recorded on the optical disk 10 is read.

In the meantime, in the optical pickup head of the optical recording reproducing apparatus, when focal length error occurs between the convergence lens 111a and the optical disk 10 because of vibration of an optical disk driving unit (not shown), flatness of the surface of the optical disk and assembly error, etc. of each construction part, static electricity is generated by supplying power to the fixed bodies 130, 120 and the moving body 150 through the upper and lower power pads 138, 137, 139, herein, by operating the moving body 150 with the static electricity, the focal length error is compensated.

Hereinafter, the focal length error compensation will be described with reference to accompanying FIGS. 10 and 11.

FIG. 10 illustrates focal length error compensation of the optical pickup head of the optical recording reproducing apparatus in accordance with the present invention.

As depicted in FIG. 10, when focal length between the optical disk 10 and the convergence lens 111a is too short, by applying power to the lower fixed body 120, the upper fixed body 13 and the moving body 150 in order to generate static electricity between the upper fixed electrode 131 and the moving electrode 151 greater static electricity between the lower fixed electrode 121 and the moving electrode 151, the whole moving body 150 is ascended at the same height, and accordingly focal length error is compensated.

FIG. 11 illustrates focal length error compensation of the optical pickup head of the optical recording reproducing apparatus in accordance with the present invention.

As depicted in FIG. 11, when an optical axis of the optical recording reproducing apparatus 10 is slant at $\Theta°$, by applying power to the lower and upper fixed bodies 120, 130 and the moving body 150 in order to generate static electricity between the lower fixed electrode 121 and the moving electrode 151 greater (or smaller) than static electricity between the upper fixed electrode 131 and the moving electrode 151, the both sides of the moving body 150 have a different ascending height, and accordingly focal length error is compensated.

Hereinafter, a fabrication method of an optical pickup head of an optical recording reproducing apparatus in accordance with the present invention will be described with reference to accompanying drawings.

Figure 12:
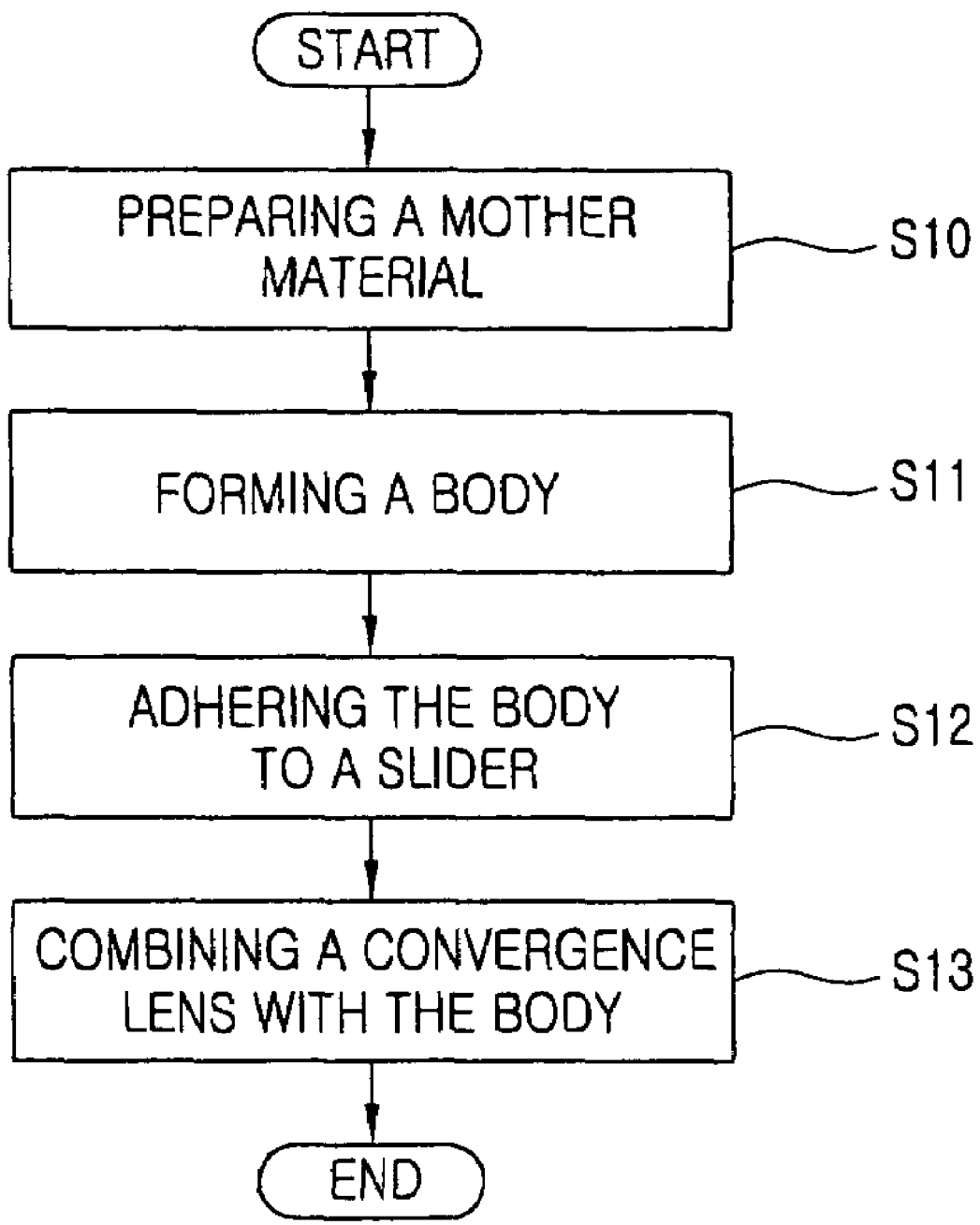
FIG. 12 is a flow chart illustrating a fabrication method of an optical pickup head of an optical recording reproducing apparatus in accordance with the present invention.

FIG. 12 is a flow chart illustrating a fabrication method of an optical pickup head of an optical recording reproducing apparatus in accordance with the present invention.

As depicted in FIG. 12, the fabrication method of the optical pickup head of the optical recording reproducing apparatus in accordance with the present invention includes steps of preparing a mother material on which a silicon layer is laminated on both sides of the insulating layer as shown at step S10; forming a lower body having a lower fixed electrode at a side of the mother body by using a certain semiconductor device fabricating processes, forming an upper body having an upper fixed electrode at the other side and forming a moving body installed between the upper and lower fixed electrodes so as to be movable and have a moving electrode alternately arranged between the upper and lower fixed electrodes as shown at step S11; joining the body obtained through the preparing step S10 to a slider as shown at step S12; and combining a convergence lens with the body as shown at step S13. Hereinafter, a lubricant-coated optical pickup head of an optical recording reproducing apparatus in accordance with the present invention will be described with reference to accompanying FIGS. 13~15.

Figure 13:
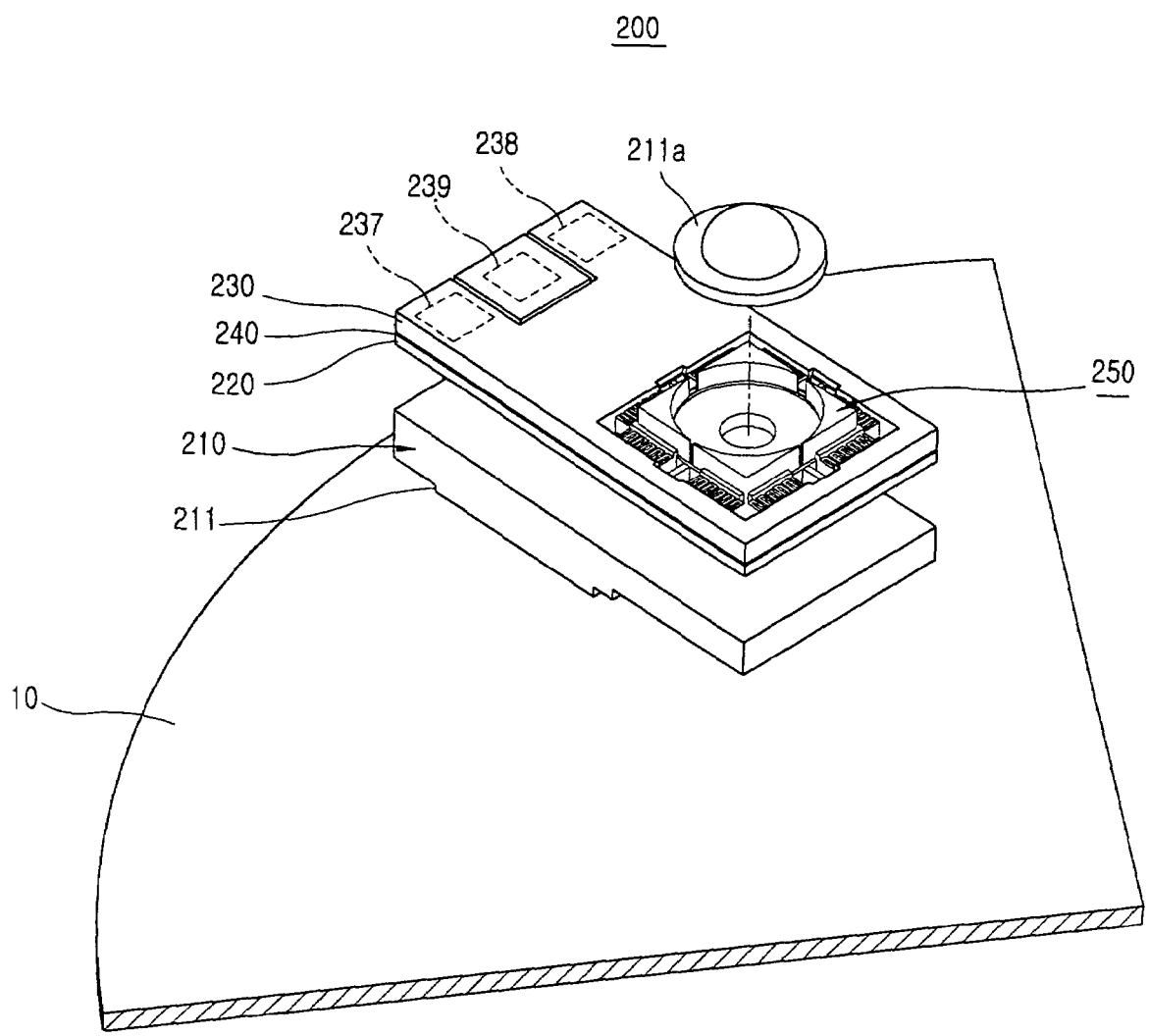
Figure 14A:
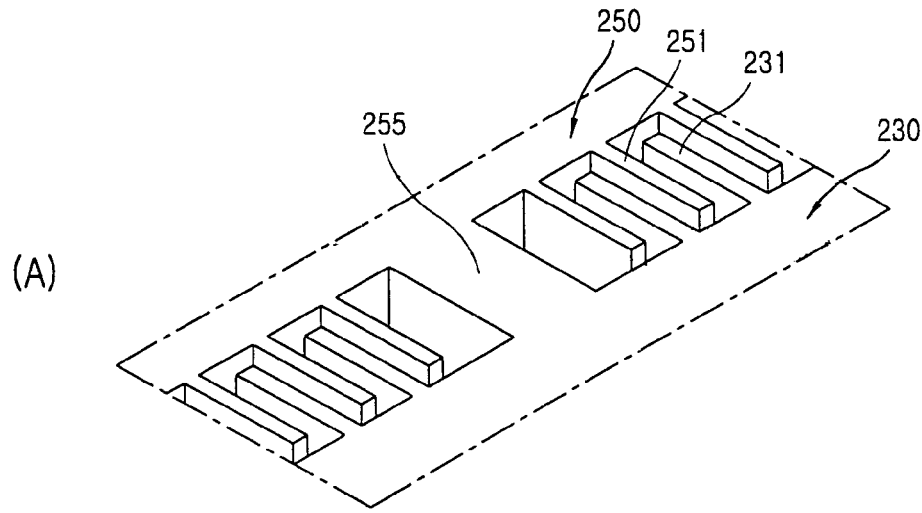
FIG. 14A illustrates an example of an elastic-supporting portion.
Figure 14B:
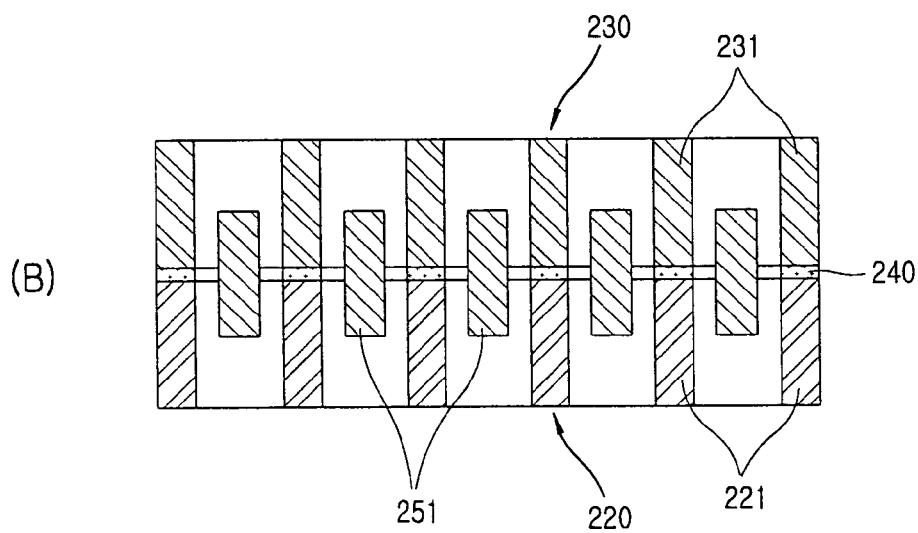
FIG. 14B is a longitudinal-sectional view illustrating a lubricant-coated optical pick up head an optical recording reproducing apparatus in accordance with the present invention.
Figure 15:
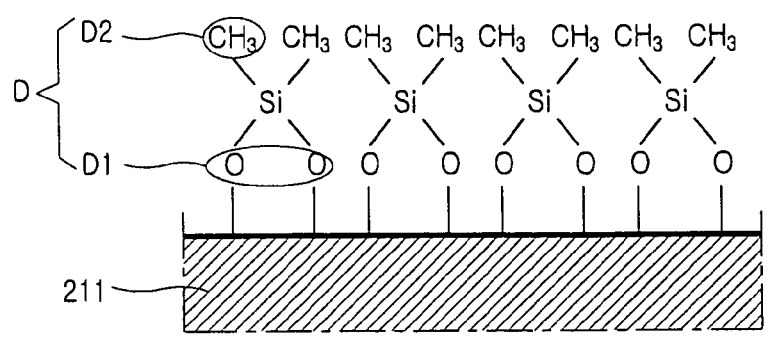

FIGS. 13~15 illustrate a lubricant-coated optical pickup head of an optical recording reproducing apparatus in accordance with the present invention;

FIG. 13 is an exploded-perspective view illustrating an optical pickup head; FIG. 14A illustrates an example of an elastic-supporting portion;

FIG. 14B is a longitudinal-sectional view illustrating a lubricant-coated optical pick up head an optical recording reproducing apparatus in accordance with the present invention; and FIG. 15 illustrates a lubricant-coated surface of a slider.

As depicted in FIGS. 13~15, the lubricant-coated optical pickup head 200 of the optical recording reproducing apparatus includes a slider 210 installed so as to be slidable along the surface of the optical disk 10, having a convergence lens 211a for focusing light at a side and having a lubricant-coated air bearing surface 211; a lower fixed body 220 arranged at the top of the slider 210 and having a lubricant-coated lower fixed electrode 221 on the inner circumference at regular intervals; an insulating layer 240 interposed between the lower fixed body 220 and the upper fixed body 230; a moving body 250 inserted into the inner circumference of the lower and upper fixed bodies 220, 230 so as to be movable in the optical axis direction and having a lubricant-coated moving electrode 251 at the outer circumference so as to be alternately arranged between the lower and upper fixed electrodes 221, 231; and plural electrode pads 237, 238, 239 for supplying power to the lower, upper and moving bodies 220, 230, 250 in order to drive the moving body 250.

The lower, upper and moving electrodes 221, 231, 251 are arranged as a comb-pattern.

The lubricant-coated air bearing 211 is formed at the bottom of the slider 210 corresponded to the optical disk 10.

An elastic-supporting portion 255 is formed between the upper and lower fixed bodies 230, 220 to support the moving body 250 elastically.

As shown in following Chemical Formula 1, the lubricant can be obtained by mixing DDMS (dichlorodimethylsilane) with a solvent of toluene or isooctane, etc. to have concentration within the range of 1~10 mMOL, herein, it is the most preferable to have concentration of 1 mMOL.

[Chemical Formula]

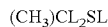

(CH$_3$)CL$_2$SL

As depicted in FIG. 15, in a chemical structure of DDMS (D) single-layered on the air bearing surface 211 of the slider 210, the air bearing surface 211 made of transparent glass substance is hydrophilic, and accordingly DDMS(D) can be easily single layer-coated.

Head group (D1) of DDMS (D) is immobilized on the air bearing surface 211 through a covalent bond, methyl group (D2) chemically combined with the head group (D1) is hydrophobic and has characteristics not combined with other substances. Because of the DDMS (D)'s characteristics, a single layer having a thickness of several A is formed on the air bearing surface 211 of the slider 210, and accordingly the formed single layer reduces friction with the optical disk.

In addition, not shown in drawings, unlike the air bearing surface, in order to coat the DDMS onto the fixed electrode and the moving electrode made of silicon, plural OH groups are formed on the surface of the fixed and moving electrodes by using hydrogen peroxide so as to have hydrophile property, afterward, the DDMS (D) is coated onto he fixed and moving electrodes.

Afterward, with reference to accompanying FIGS. 16~20, a method for coating lubricant on an optical pickup head of an optical recording reproducing apparatus in accordance with the present invention will be described with reference to accompanying FIGS. 16~20.

Figure 16:
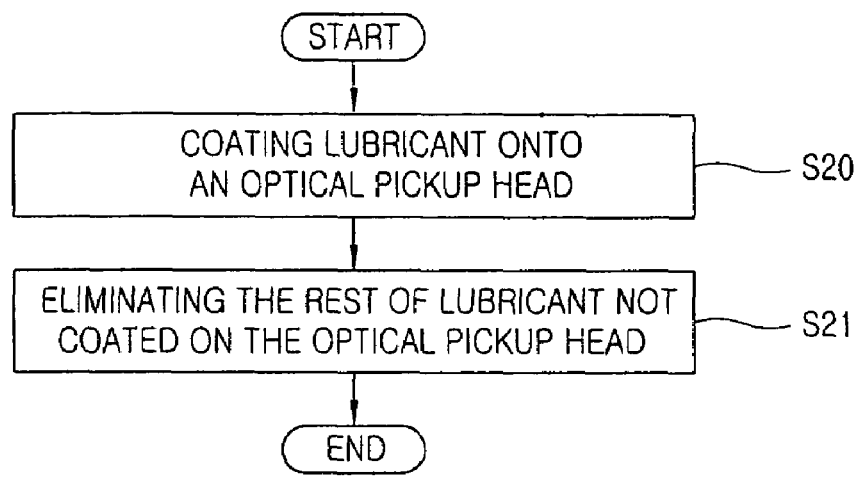

FIG. 16 is a flow chart illustrating an example of a coating process of a lubricant-coated optical pickup head in accordance with the present invention.

As depicted in FIG. 16, the method includes steps of coating lubricant on the upper and lower fixed electrodes, the moving electrode and the air bearing surface of the slider by dipping the optical pickup head into lubricant; and dipping the optical pickup head into the toluene solvent in order to eliminate the rest of lubricant not coated onto the upper and lower fixed electrodes, the moving electrode and the air bearing surface of the slider.

Figure 17:
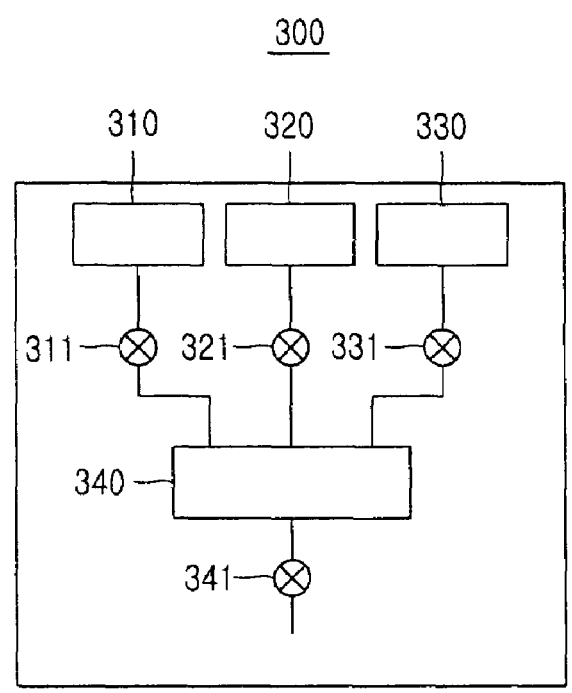
Figure 18:
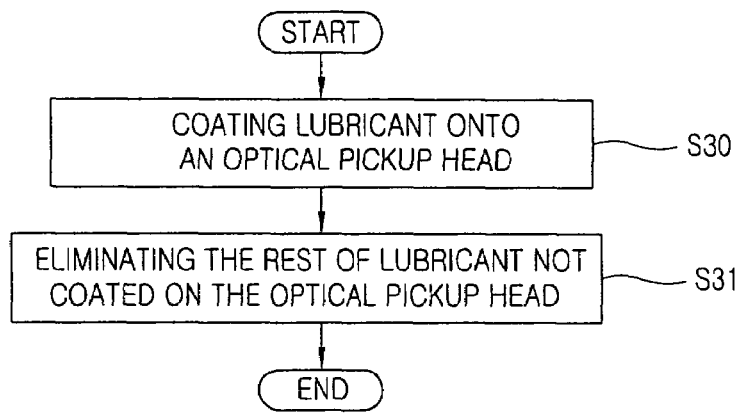

FIG. 17 illustrates a lubricant coating apparatus; and FIG. 18 is a flow chart illustrating another example of a coating process of a lubricant-coated optical pickup head in accordance with the present invention.

First, as depicted in FIG. 17, the lubricant coating apparatus 300 includes an oxidizing agent storing tank 310 for containing an oxidizing agent; a lubricant storing tank 320 for storing lubricant; a solvent storing tank 330 for storing a solvent; and a lubricant coating container 340 respectively connected to the oxidizing storing tank 310, the lubricant storing tank 320 and the solvent storing tank 330.

An oxidizing agent storing tank adjusting valve 311 is connected to the oxidizing agent storing tank 310, a lubricant storing tank adjusting value 321 is connected to the lubricant storing tank 320, a solvent storing tank adjusting value 331 is connected to the solvent storing tank 330, and a discharge value 341 is installed at the lubricant coating container 340.

As depicted in FIGS. 17 and 18, another example of the coating method of the lubricant-coated optical pickup head includes steps of installing an optical pickup head in a flow channel of a coating instrument in which lubricant flows and coating the lubricant onto the upper and lower fixed electrodes, the moving electrode and the air bearing surface of the slider of the optical pickup head by opening the lubricant storing tank adjusting valve 321 as shown at step S30; and eliminating the rest lubricant not coated onto the upper and lower fixed electrodes, the moving electrode and the air bearing surface of the slider of the optical pickup head by making the toluene solvent flow by shutting the lubricant storing tank adjusting valve 321 and opening the solvent storing tank adjusting valve 331 as shown at step S31.

Figure 19:
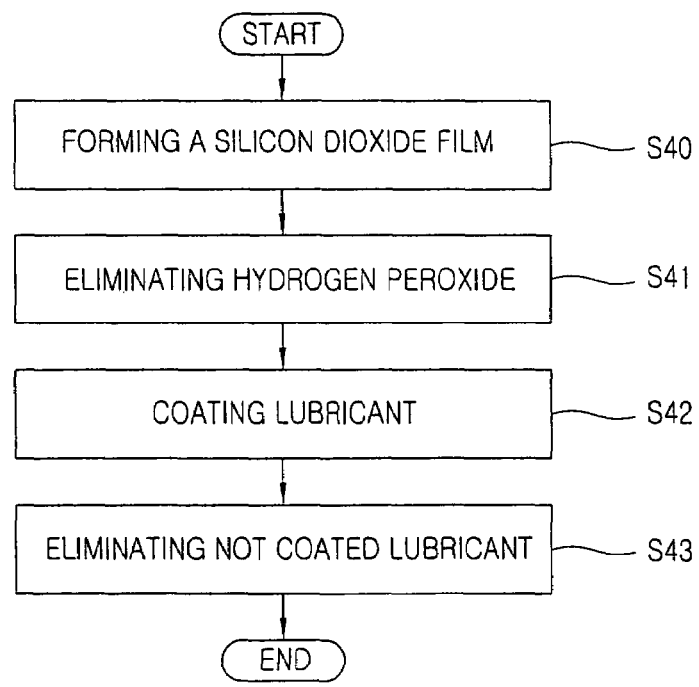

FIG. 19 is a flow chart illustrating yet another example of a coating process of a lubricant-coated optical pickup head in accordance with the present invention.

As depicted in FIG. 19, yet another example of the coating process of the lubricant-coated optical pickup head in accordance with the present invention includes steps of forming a silicon dioxide film on the upper and lower fixed electrodes, the moving electrode and the air bearing surface of the slider by dipping the optical pickup head into hydrogen peroxide as shown at step S40; dipping the optical pickup head into the toluene solvent in order to eliminate the rest hydrogen peroxide on the upper and lower fixed electrodes, the moving electrode and the air bearing surface of the slider as shown at step S41; coating lubricant on the upper and lower fixed electrodes, the moving electrode and the air bearing surface of the slider by dipping the optical pickup head into the lubricant as shown at step S42; and dipping the optical pickup head into a solvent in order to eliminate the rest lubricant on the upper and lower fixed electrodes, the moving electrode and the air bearing surface of the slider as shown at step S43.

FIG. 20 is a flow chart illustrating still another example of a coating process of a lubricant-coated optical pickup head in accordance with the present invention.

As depicted in FIG. 20, still another example of the coating process of the lubricant-coated optical pickup head in accordance with the present invention includes steps of forming a hydrogen peroxide film on the upper and lower fixed electrodes, the moving electrode and the air bearing surface of the slider by arranging an optical pickup head in a flow channel in which hydrogen peroxide flows as shown at step S50; making a toluene solvent flow into the flow channel in order to eliminate the rest hydrogen peroxide not coated on the upper and lower fixed electrodes, the moving electrode and the air bearing surface of the slider as shown at step S51; making lubricant flow into the flow channel in order to coat the lubricant onto the upper and lower fixed electrodes, the moving electrode and the air bearing surface of the slider as shown at step S52; and making the toluene solvent flow into the flow channel in order to eliminate the rest lubricant on the upper and lower fixed electrodes, the moving electrode and the air bearing surface of the slider as shown at step S53.

As described-above, by coating single-layered lubricant of several A on the surface of the slider, it is possible to prevent the surface of the optical disk from being damaged by the slider, by reducing frictional force between the slider and the optical disk, damage on the optical disk can be reduced, and accordingly life-span of the head of the optical recording reproducing apparatus can be increased.

In addition, due to moisture in the air, a fixed electrode and a moving electrode fabricated by the MEMS technique may be adhered to each other in performing of minute operation, by coating lubricant on the fixed and moving electrodes, adhesion can be prevented, and accordingly minute operation can be performed smoothly.

Because methyl group adhered to the DDMS has hydrophile property, by absorbing moisture of the fixed and moving electrodes, adhesion thereof can be prevented.

Because the DDMS single layer is stable at a high temperature, it can perform lubricant operation smoothly even at 300~400° C.

As described-above, in the present invention, by coating lubricant on the surface of the slider, lubricant operation can be performed without damaging characteristics of the head, scratch phenomenon can be prevented by reducing a frictional force, and accordingly life-span of the head and the recording medium can be increased.

And, the adhesion problem of the moving and fixed electrodes fabricated by the MEMS technique can be solved.

And, because the DDMS single layer is stable at a high temperature, lubricant operation can be performed smoothly after passing a package process in which a temperature rises at 300~400° C.

What is claimed is:

1. An optical pickup head of an optical recording reproducing apparatus, comprising:
   a slider installed so as to be slidable along the surface of an optical disk and having a convergence lens at a side for focusing light;
   a micro-actuating means installed so as to be laminated with the slider in order to adjust an optic axis of the convergence lens minutely;
   a lower fixed body installed at the top of the slider, having plural lower fixed electrodes on the inner circumference at regular intervals;
   an upper fixed body installed at the top of the lower fixed body so as to be corresponded to a shape of the lower fixed body and have plural upper fixed electrodes on the inner circumference at regular intervals;
   an insulating layer interposed between the lower fixed body and the upper fixed body;
   a moving body installed so as to be corresponded to the lower and upper fixed bodies, moving in the optical axis direction and having a moving electrode at the outer circumference arranged alternately between the lower and upper fixed electrodes; and
   plural electrode pads for supplying power to the lower fixed body, the upper fixed body and the moving body in order to drive the moving body.

2. The optical pickup head of claim 1, wherein the lower fixed electrode, the upper fixed electrode and the moving electrode are arranged as a comb-pattern.

3. The optical pickup head of claim 1, wherein the slider is made of a transparent material.

4. The optical pickup head of claim 3, wherein an air bearing surface is formed on the bottom surface of the slider corresponded to the optical disk.

5. The optical pickup head of claim 1, wherein a magnetic coil is formed at the slider in order to magnetize the optical disk.

6. The optical pickup head of claim 5, wherein the magnetic coil is inserted into an insertion groove formed at the bottom surface of the slider.

7. The optical pickup head of claim 6, wherein filler having at least one of $SiO_2$ and $Si_3N_4$ charged around the circumference of the magnetic coil of the slider.

8. The optical pickup head of claim 1, further comprising:
   an elastic-supporting portion in which one side is connected to the upper fixed body and another side is connected to the moving body in order to support the moving body elastically.

* * * * *